United States Patent [19]
Kovacs et al.

[11] Patent Number: 5,671,252
[45] Date of Patent: Sep. 23, 1997

[54] SAMPLED DATA READ CHANNEL UTILIZING CHARGE-COUPLED DEVICES

[75] Inventors: Janos Kovacs, N. Andover; Scott C. Munroe, Carlisle, both of Mass.

[73] Assignee: Analog Devices, Inc., Norwood, Mass.

[21] Appl. No.: 310,050

[22] Filed: Sep. 21, 1994

[51] Int. Cl.$^6$ .................................................. H04L 27/06
[52] U.S. Cl. ........................ 375/316; 375/232; 375/290; 360/65
[58] Field of Search .................................. 375/232, 263, 375/290, 316, 345; 360/46, 51, 65; 364/724.16, 724.2

[56] References Cited

U.S. PATENT DOCUMENTS

| | | | |
|---|---|---|---|
| 4,375,059 | 2/1983 | Schlig | 340/347 AD |
| 4,489,309 | 12/1984 | Schlig | 340/337 AD |
| 4,707,681 | 11/1987 | Eggenberger et al. | 340/347 DD |
| 4,786,890 | 11/1988 | Marcus et al. | 341/81 |
| 5,126,682 | 6/1992 | Weinberg et al. | 329/304 |
| 5,220,466 | 6/1993 | Coker et al. | 360/46 |
| 5,258,940 | 11/1993 | Coker et al. | 364/724.16 |
| 5,260,703 | 11/1993 | Nguyen et al. | 341/100 |
| 5,276,705 | 1/1994 | Higgins | 375/200 |
| 5,311,178 | 5/1994 | Pan et al. | 341/59 |
| 5,321,559 | 6/1994 | Nguyen et al. | 360/46 |
| 5,341,249 | 8/1994 | Abbott et al. | 360/46 |
| 5,422,760 | 6/1995 | Abbott et al. | 360/46 |

OTHER PUBLICATIONS

Blalock, Travis and Tom Hornak, "A CMOS Analog Delay Line with 100 MHz Clock Rate", Hewlett Packard Laboratories, California.

Cioffi, John M., William L. Abbott, Hemant K. Thapar, C. Michael Melas, and Kevin D. Fisher, "Adaptive Equalization in Magnetic-Disk Storage Channels", *IEEE Communications Magazine*, Feb. 1990, p. 14–29.

Coker, J.D., R. L. Galbraith, G. J. Kerwin, J. W. Rae, and Pp.A. Ziperovich, "Implementation of PRML in a Rigid Disk Drive", *IEEE Transactions on Magnetics*, vol. 27, No. 6, Nov. 1991, pp. 4538–4543.

Electronic Design, "Technology Newsletter", Apr. 1, 1993, p. 25.

Haystead, John, "A Merger Born of Acoustic Charge Transport", *EDN Products & Careers Edition*, Nov. 5, 1992, p. 7.

(List continued on next page.)

*Primary Examiner*—Stephen Chin
*Assistant Examiner*—T. Ghebretinsae
*Attorney, Agent, or Firm*—Samuels, Gauthier, Stevens & Reppert

[57] ABSTRACT

A data receiving and processing channel including analog signal processing circuitry operable for receiving data in the form of an input analog signal, and modifying the input signal in accordance with selected parameters so as to generate a modified analog input signal. According to one embodiment, there is provided a charge domain signal equalizer which initially transforms the modified analog input signal into a corresponding analog charge domain signal, the equalizer performing waveform shaping of the analog charge domain signal in accordance with a predetermined signal response template; a charge domain analog-to-digital converter operable for converting the analog charge domain signal into a corresponding digital signal; and a digital signal processor operable for recovering a digital bit stream from the digital signal which is indicative of the original data. In an alternative embodiment, there is provided an analog-to-digital converter operable for converting the modified analog input signal into a corresponding digital signal; a charge signal equalizer which initially transforms the digital signal into a corresponding digital charge signal, the equalizer performing waveform shaping of the digital charge signal in accordance with a predetermined signal response template; and a charge domain digital signal processor operable for recovering a digital bit stream from the digital charge domain signal which is indicative of the original data.

38 Claims, 8 Drawing Sheets

OTHER PUBLICATIONS

Khoury, John M., "A 15MHz CMOS Continuous Time Bessel Filter for Disk Drives", *Hard–Disk and Data–Communication IC's*, pp. 134–135.

Kovacs, Janos and Scott Munroe, "A CMOS/CCD Chip Architecture for Sampled Data Disck Drive Read Channel Applications" *IDEMA Diskcon '93 International Technical Conference*, Sep. 29–30, 1993, California, cover page, table of contents, pp. 3–12.

Nass, Richard, "Disk–Drive Read–Channel IC Maximizes PRML Advantages with 'Bottom–Up' Design", *Electronic Design*, Mar. 21, 1994, pp. 42, 44–46.

Philpott, Rick A., Robert A. Kertis, Ray A. Richetta, Timothy J. Schmerbeck and Donald J. Schulte, "A 7 Mbyte/s (65 MHz), Mixed–Signal, Magnetic Recording Channel DSP Using Partial Response Signaling with Maximum Likelihood Detection", *IEEE Journal of Solid–State Circuits*, vol. 29, No. 3, Mar. 1994, pp. 177–184.

Schmerbeck, Timothy J., "A 27 MHz Mixed Analog/Digital Magnetic Recording Channel DSP Using Partial Response Signalling with Maximum Likelihood Detection", *Hard–Disk and Data–Communication IC's*, pp. 136–139.

SAMPLED DATA READ CHANNEL UTILIZING CHARGE-COUPLED DEVICES

BACKGROUND OF THE INVENTION

The present invention relates generally to the implementation of charge-coupled devices (CCDs) in a data receive and processing channel, and more particularly to the implementation of charge-coupled devices in a sampled data hard disk drive data read channel which, for example, utilizes partial-response signalling and maximum-likelihood (PRML) detection.

Disk drive units are conventionally used in computers for storing and reading data. Conventional disk drives are configured with rotating stacked rigid magnetic disks on which the desired data is stored in magnetic form. The data is recorded in concentric, radially spaced data information tracks which are arrayed on the surfaces of the magnetic disks. Transducer heads driven in a path toward and away from the drive axis write data to the disks and read data from the disks. Achievement of high data density and high data rates has resulted in the use of a PRML channel. For example, PRML sequence detection techniques are known for digital data communication and recording applications, as shown in U.S. Pat. No. 4,786,890.

In order to obtain full advantage of PRML, the received signal or the read signal must be passed through a specially designed equalizing filter which produces at its output a signal spectrum corresponding to the wave shape for which the maximum-likelihood detector is designed. When using digital filtering in a PRML system, the filter is typically located between an analog-to-digital converter (ADC) and other signal processing hardware which controls the system and performs the detection.

Conventional channels typically utilize digital implementations which have certain performance limitations. Specifically, the digital processing elements in such channels are unable to sustain required clock rates. For example, in order to construct a fast digital multiplier, present implementations require the use of 0.6 micron processes that may achieve 100 megahertz clock rate at best, while consuming a significant amount of power. Thereafter, it reaches a point in manufacturing where building channels with the conventional digital processes becomes too expensive. Unfortunately, the conventional read channels often experience bottlenecks with respect to the speed at which the data is processed in the channels, and the power required.

SUMMARY OF THE INVENTION

Accordingly, it is an object of the present invention to provide a data receiving and processing channel which is implemented with charge-coupled devices.

It is another object of the present invention to provide a hard disk drive read channel which is implemented with charge-coupled devices.

It is yet another object of the present invention to provide an improved read channel which has enhanced data processing speed, reduced power consumption, and reduced size or die area.

According to one embodiment of the present invention there is provided a data receiving and processing channel. The channel includes analog signal processing circuitry operable for receiving data in the form of an input analog signal, and modifying the input signal in accordance with selected parameters so as to generate a modified analog input signal. A charge domain signal equalizer initially transforms the modified analog input signal into a corresponding analog charge domain signal, the equalizer performing waveform shaping of the analog charge domain signal in accordance with a predetermined signal response template. A charge domain analog-to-digital converter is operable for converting the analog charge domain signal into a corresponding digital signal. A digital signal processor is provided for recovering a digital bit stream from the digital signal which is indicative of the data.

In accordance with another embodiment of the present invention, there is provided a data receiving and processing channel which includes analog signal processing circuitry operable for receiving data in the form of an input analog signal, and modifying the input signal in accordance with selected parameters so as to generate a modified analog input signal. An analog-to-digital converter is operable for converting the modified analog input signal into a corresponding digital signal. A charge domain signal equalizer initially transforms the digital signal into a corresponding digital charge signal, the equalizer performing waveform shaping of the digital charge signal in accordance with a predetermined signal response template. A charge domain digital signal processor is provided for recovering a digital bit stream from the digital charge signal which is indicative of the data.

Many circuits implemented with CCDs are inherently faster devices than corresponding circuits constructed with the conventional digital technology. In fact, utilizing CCDs in data receiving channels can achieve on the order of 500 megahertz clock rates with 0.6 µm in technology. Another advantage of CCDs in data receiving channels is that the conventional digital implementations are very power hungry. Digital signal processing devices running at very high clock rates tend to burn a tremendous amount of power. CCDs are more power efficient. Another advantage is silicon areas. Digital circuits are relatively bulky as a consequence of their low information density (binary), evidenced by the fact that it takes thousands of transistors just to configure a 16-bit multiplier. Digital delay components contain approximately 6–8 flip-flops, each one having about 10 transistors. To achieve the same function in CCD technology requires building four "transistors" which shift charge. Accordingly, CCDs can be viewed as structures with very high information density, which translates into less cost and less power, and higher clock speed.

DETAILED DESCRIPTION OF THE ILLUSTRATED EMBODIMENTS

Figure 1:
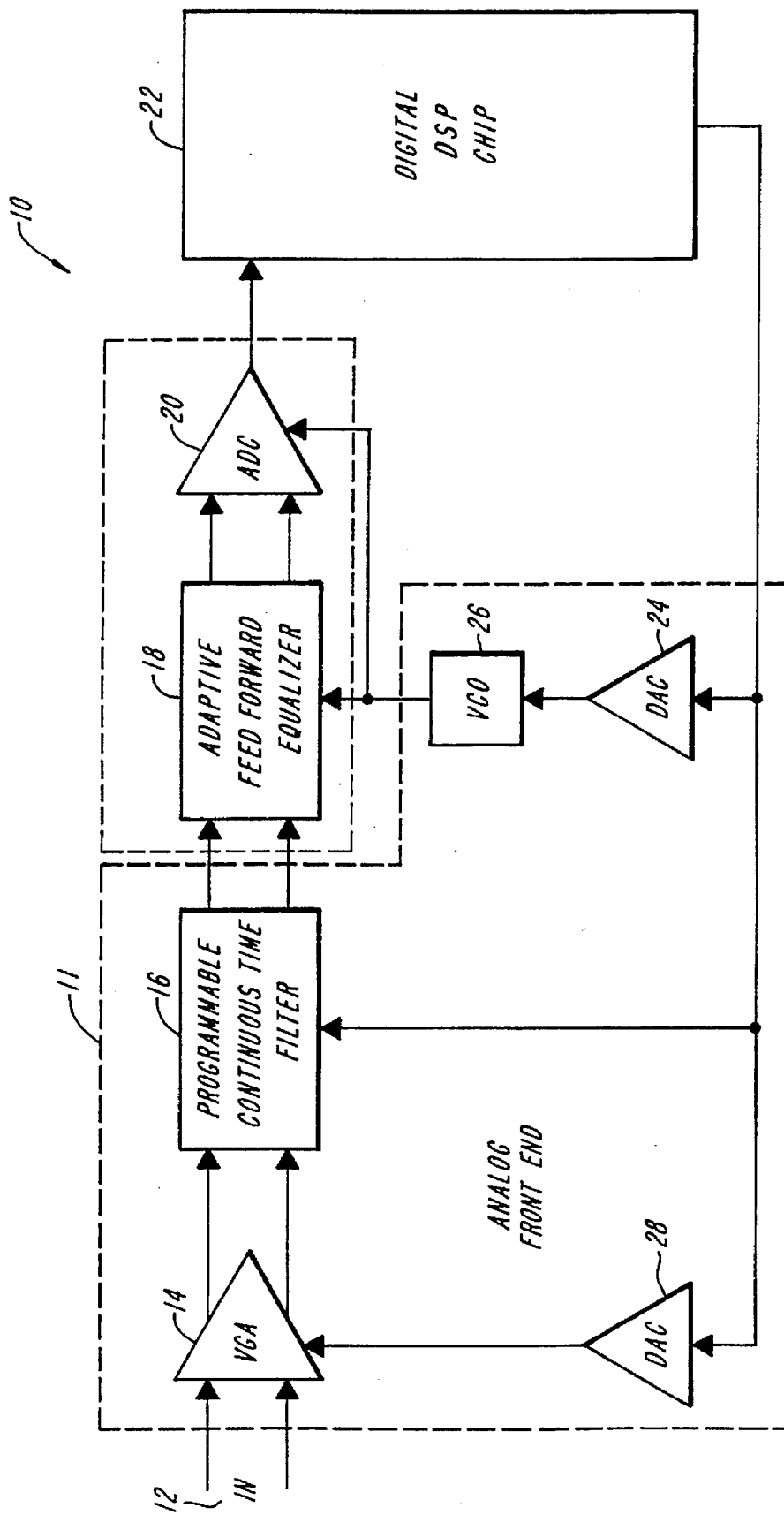
FIG. 1 shows a block diagram of an exemplary data receiving channel in accordance with the present invention illustrated as a hard disk drive partial-response maximum-likelihood (PRML) read channel.

With reference now to FIG. 1, there is shown a block diagram of an exemplary data receiving channel 10 in accordance with the present invention. For purposes of explanation, the channel 10 is illustrated as a hard disk drive partial-response maximum-likelihood (PRML) read channel. An analog read signal is obtained from the disk head 12 and is applied to an analog front end processing portion 11. The read signal is initially applied to a variable gain amplifier (VGA) 14 in order to normalize the signal. The read signal is then applied to a programmable continuous time filter 16 in order to filter the read signal so as to remove high-frequency noise components and to band limit the signal. The filtered read signal best represents the output of the analog front end processing portion 11.

The read signal provided by the analog front end processing portion 11 is thereafter provided to an adaptive feed forward equalizer 18 and subsequently to an analog-to-digital converter 20, both of which are implemented with charge-coupled devices in accordance with the present invention as will be hereinafter described. It will be appreciated by those of skill in the art that the exemplary read channel 10 is illustrated for purpose of illustrations as a single ended system, and that configurations utilizing fully differential system are possible. The read signal is then provided to a digital signal processing unit 22, which processes the read signal and the encoded data therein while providing adaptive feedback to both the VGA 14 via digital-to-analog converter (DAC) 28 and to the equalizer 18 via DAC 24 and voltage controlled oscillator (VCO) 26.

The equalizer 18 provides waveform shaping of the analog read signal to the required partial response. In accordance with the present invention, the equalizer 18 is implemented with CCD technology. Briefly, a series of charge packets representative of the read signal are propagated in the equalizer. Delay stages are utilized to propagate the programmably-weighted charge packets so that the final summation of charge packets can be compared to a predetermined signal representation. Each of the charge packets is then modified with a new (adjusted) tap weight and thereafter summed together in accordance with the operation of an FIR filter, with the goal being to narrow the difference between the actual and ideal signal pulse shape.

In the time domain, the result of such an operation is that the output waveform is different from the input waveform. The purpose behind this result in the exemplary partial response channel is to shape the waveform to a predetermined template. For example, in a class IV or PR4 operation, the template is described by the conventionally known $(1-D^2)$ operation, where D is a unit delay operator. This operation limits in the time domain the sampled values that you can have in the channel. In other words, with reference to the sampled input waveform, the desired result is to achieve nominal values of the sample at the sampling instances. For example, for PR4, the result would have +1, 0 −1, three distinct levels which represent the only allowable levels.

Clearly, there is an advantage in minimizing the analog continuous time processing by shifting into the more flexible sample data processing. With CCDs it becomes practical to extend the length of the feed forward equalizer so as to have numerous taps and to do most of the signal and frequency shaping. This will lead to the use of very simple continuous time front-end filters instead of the conventionally utilized ripple filters which are relatively large in area and dissipate large amounts of power.

Figure 2:
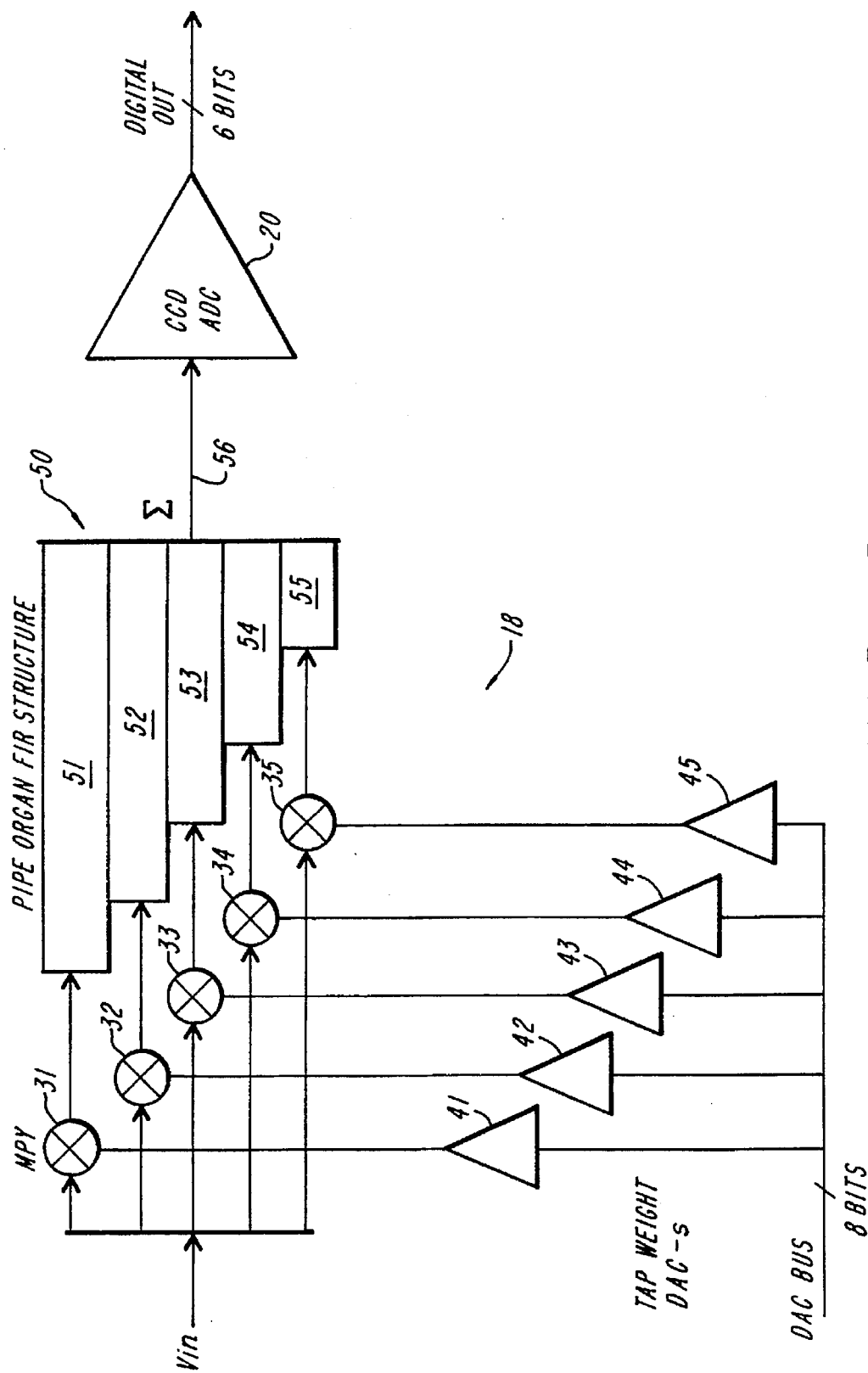
FIG. 2 shows an exemplary embodiment of an adaptive feed forward equalizer configured on a transposed implementation of charge-coupled device FIR filters.

The equalizer 18 in the exemplary embodiment illustrated is configured on a transposed implementation of CCD FIR filters as shown in FIG. 2. The analog read signal is distributed in parallel to five multipliers 30–35. It will be appreciated that the number of distribution lines can be extended to 20 or more at the cost of minimal additional dissipation. The multipliers 31–35 are realized by charge domain voltage-controlled gain elements. Tap weights are provided by CMOS DACs 41–45 with 8 bit resolution.

A delay line 50 is configured using a CCD pipe organ structure. Instead of providing taps at various delay points, the charge packets are propagated through individual delay lines 51–55 with progressively increasing number of delay elements. This architecture avoids the need for individual sense amplifiers at every tap location. The weighted signal components are summed in the charge domain at the output 56.

Figure 3:
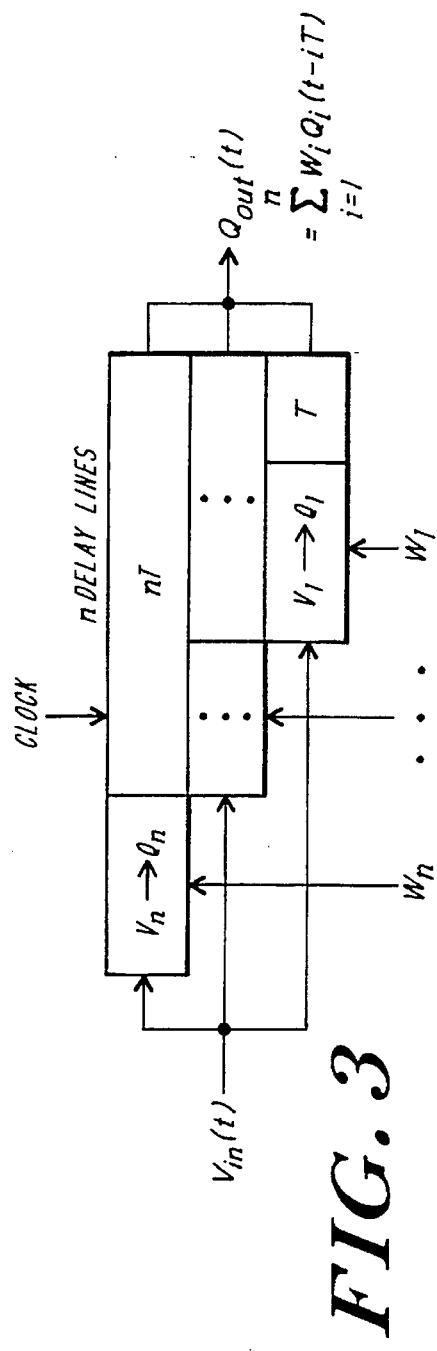
FIG. 3 shows a block diagram representation of the multiple fixed length CCD delay lines used in the pipe organ delay line of the equalizer illustrated in FIG. 2.

With reference to FIG. 3, a block diagram representation of the multiple fixed length CCD delay lines used in the pipe organ delay line 50 having delay units T through NT. In operation, tap weights $W_1$ through $W_n$ and the input signal are fed in parallel to each of the delay lines. Initially, a conventional voltage to charge conversion takes place which is controlled by the input signal and by the weight that is applied to each delay line. The key point is that Vn, which becomes Qn, will be delayed n stages, and V1, which becomes Q1 will be delayed one stage. The output of the delay line will therefore be $$Q_{out}(t) = \sum_{i=1}^{n} W_i Q_i(t - iT) \quad (1)$$

It will be appreciated that the tap weights W are adaptive to the error signal that is produced by the digital signal processor 22, and the operation of the equalizer 18 minimizes that error signal. Conventionally, each track of the disk drive includes a stored training sequence. The sequence is a known pattern of bits, which when read in the adaptive equalization scheme, will cause the correction of any distortion in the read channel in order to maximize the fidelity of the final signal to the original data. This operation is necessary because of the varying parameters of the stored data from track to track.

Figure 4A:
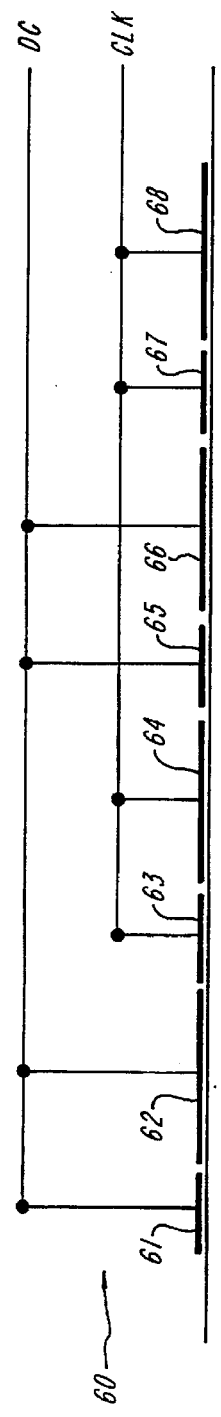
FIG. 4A shows an exemplary CCD shift register or delay line.

FIG. 4A shows an exemplary CCD shift register or delay line 40 which can be used in the pipe organ delay line 50 of FIG. 2, and FIGS. 4B–4E show the associated operational potential diagrams. For purposes of illustration the exemplary delay line 60 is a uniphase device having gate electrodes 61–68 for propagating a charge packet. In addition, gate electrodes 61, 62, 65 and 66 are tied to a DC potential, while gate electrodes 63, 64, 67 and 68 are clocked.

Figure 4B:
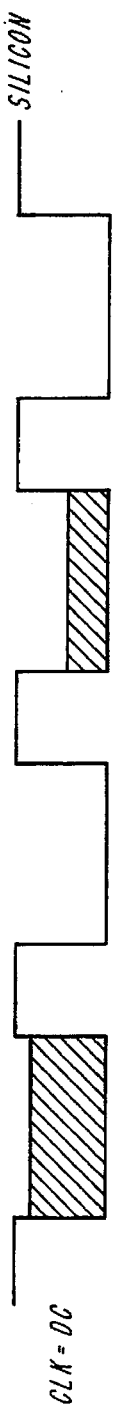
FIGS. 4B–4E show the associated operational potential diagrams for the signal charge packets.

In the first potential diagram of FIG. 4B, the clock potential is equal to the DC potential. In this case, there are potential wells associated with gates 62 and 66 which contain charge packets, and there are empty wells associated with gates 64 and 68 therebetween. The charge packets can be analog in amplitude, all the way from zero to full well.

Figure 4C:
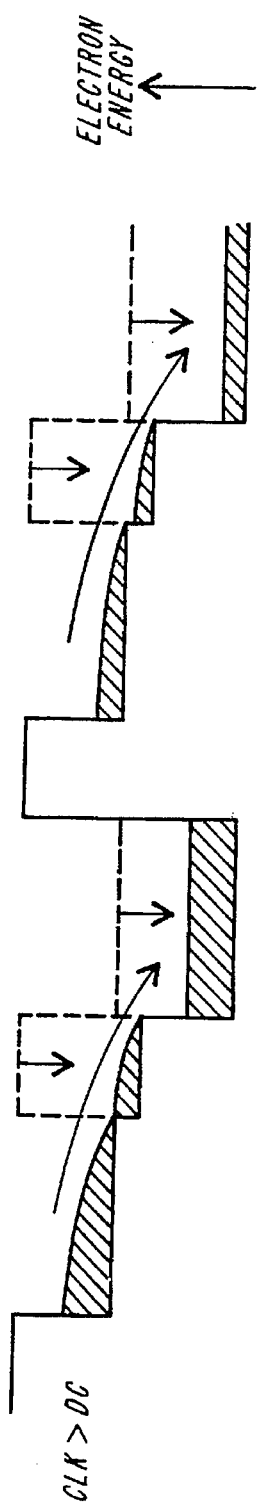

In the second potential diagram of FIG. 4C, the clock potential is made lower, which for electrons means that the clock voltage is higher than the DC potential. This operation forms a lower potential well under the clocked gates 63 and 67, and as soon as the barrier of the clock phase falls below the charge level in the preceding DC phase, charge will start to flow. Complete charge transfer will not be achieved, however, until the barrier is actually below the bottom of the preceding storage well.

Figure 4D:
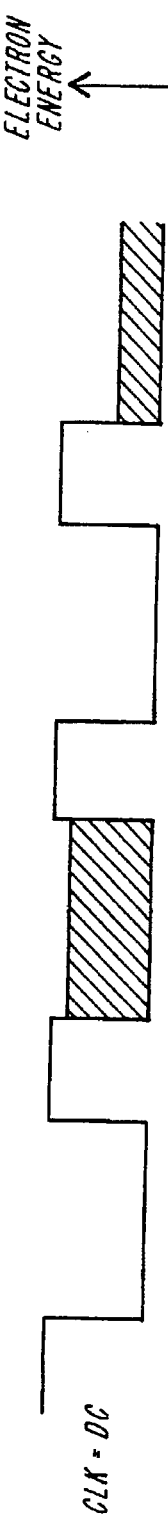
Figure 4E:
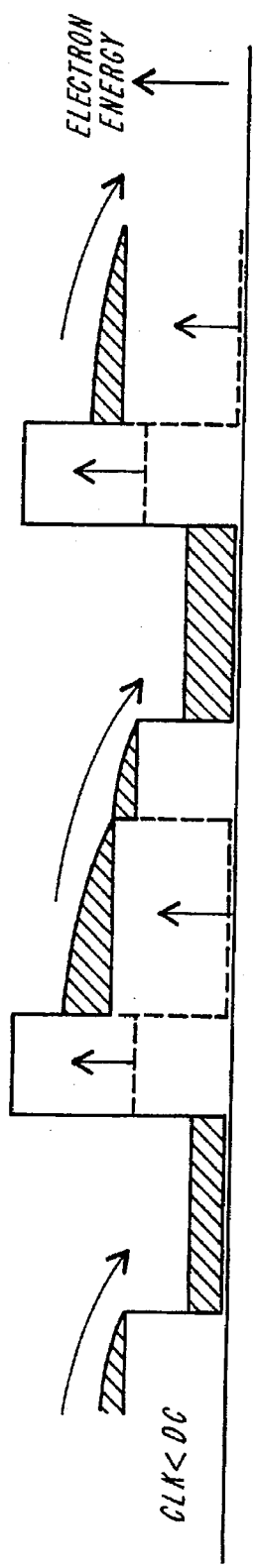

In the third potential diagram of FIG. 4D, the clock potential has reversed such that it has gone from equal to the clock in the first phase, to having gone up to a positive level, e.g. 5 volts in the second phase, and is now coming down so as to once again be equal to the DC potential. Accordingly, the charge packets have moved over one stage. Thereafter, the clock keeps going down to ground, which is higher potential for electrons, and as soon as the charge potential basically exceeds the potential of the following DC barrier, the charge will start to flow. A shown in FIG. 4E, the clock storage well bottom potential will have to be higher than the succeeding clock barrier potential in order to completely transfer out the charge. This operation is repeated in order to propagate the charge along the length of the delay line.

Figure 5:
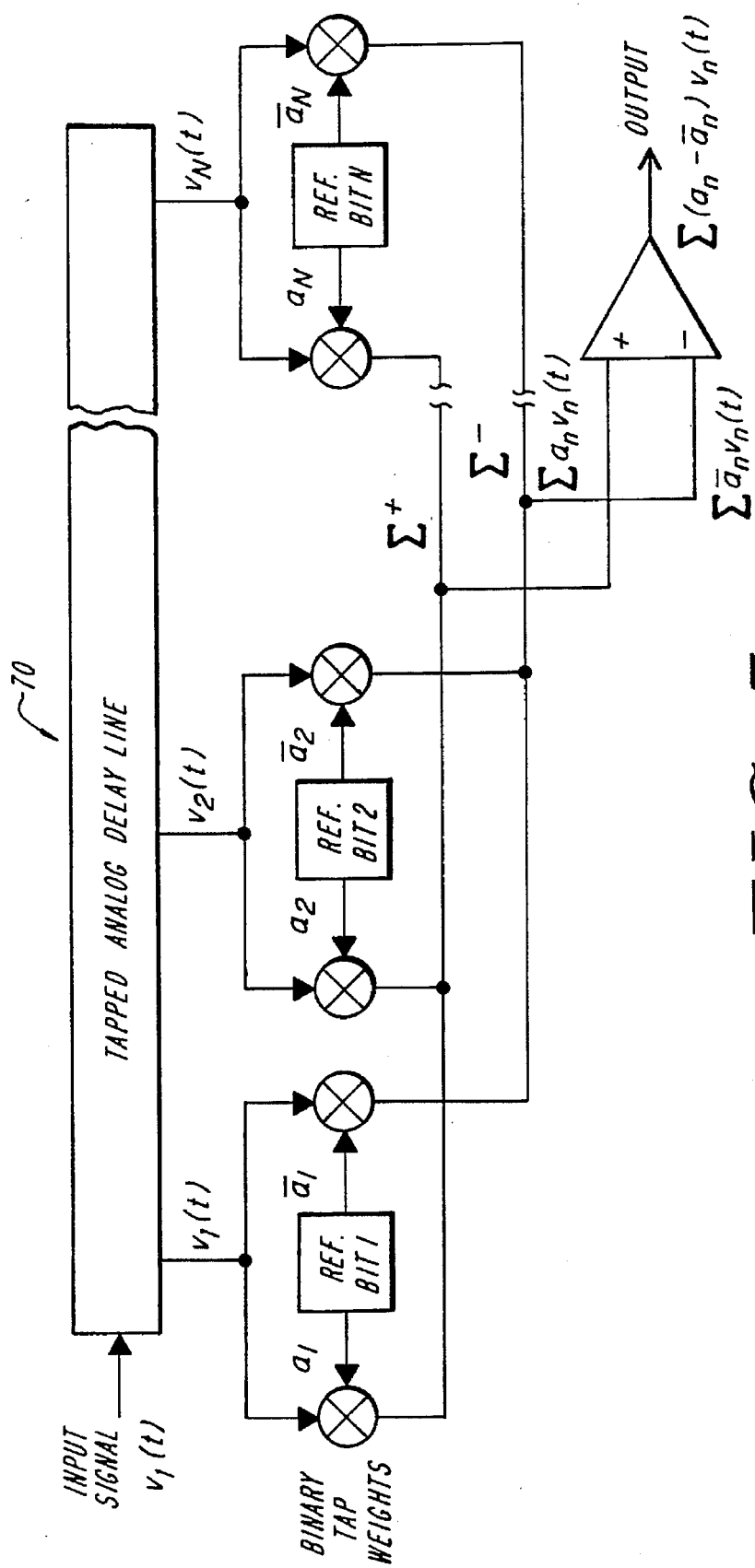
FIG. 5 shows an exemplary programmable analog-digital transversal filter.

The illustrated pipe organ architecture utilized in the equalizer 18 as shown in FIG. 2 is not the only architecture that can be used for CCD implementation. It will be appreciated by those of skill in the art that a linear shift register that is tapped could alternatively be used. For example, a programmable analog-digital transversal filter 70 as shown in FIG. 5, and described in U.S. Pat. No. 5,126,682, incorporated herein by reference, may be utilized. The linear tap delay line provides a way to get a binary weighting, either +1 or −1, under control of a programmable reference bit.

Accordingly, the equalizer 18 operates in a manner in which the analog read signal is input into the series of multipliers 31–35, each of which multiplies the read signal by a predetermined filter coefficient or tap weight provided by the DACs 41–45. The output of each multiplier 31–35 is respectively input into delay lines 51–55, each delay line having a different length corresponding to differing delay elements. For example, the output of multiplier 35 is delayed by one clock cycle, the output of multiplier 34 is delayed by two clock cycles, etc. The delay line outputs are then combined to produce a summation output signal 56.

The charge packets representing the filtered read signal are then propagated to the CCD analog-to-digital converter 20. The signal conversion eliminates the intermediate charge to voltage conversion step, which leads to a very efficient circuit implementation and strictly digital communication with a digital signal processing unit 22. The ADC 20 operation relies only on fundamental charge domain operations, mainly charge splitting and charge summing. The digitally encoded signal value appears at the comparators outputs in offset binary form. The output can then be conveniently converted to any other binary representation.

Figure 6A:
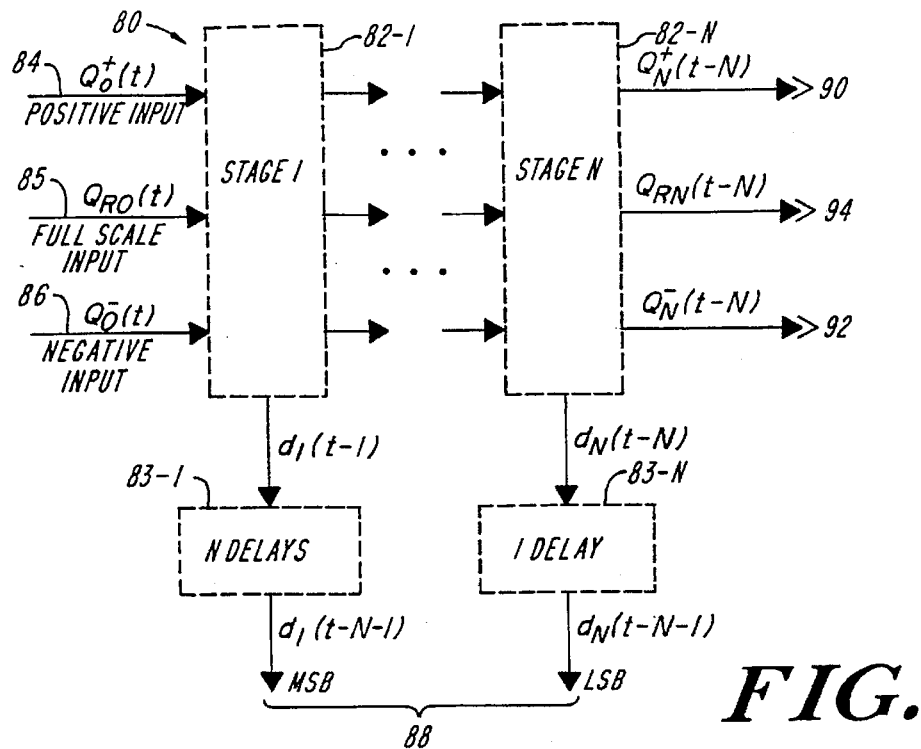
FIGS. 6A and 6B respectively show a block diagram of an exemplary CCD pipeline analog-to-digital converter and a single processing stage.
Figure 6B:
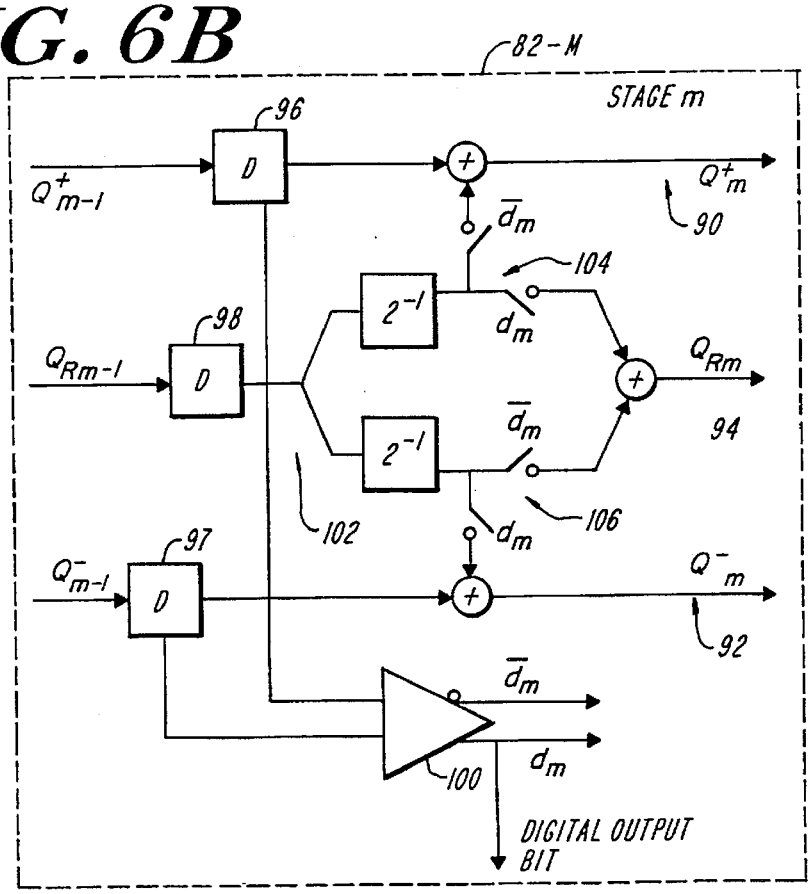

With reference now to FIGS. 6A and 6B, a block diagram of an exemplary CCD pipeline analog-to-digital converter 80 and a single processing stage 82-M are respectively shown. The pipelined architecture requires charge transfer only between neighboring CCD wells. The result is determined successively, from the most significant bit (MSB) to the least significant bit (LSB), through series of identical processing stages 82-1 through 82-N. Multiple inputs 84, 85, 86 are processed in parallel along the pipeline and one digital word 88 is completed at each cycle.

The conversion algorithm utilized in stage 12-M of the converter is as follows:

CHARGE IN POSITIVE AND NEGATIVE CHANNELS AT STAGE m $$Q_m^+ = Q_0^+ + Q_{R0} \times \sum_{i=1}^{m} d_i 2^{-i} \quad (2)$$

$$Q_m^- = Q_0^- + Q_{R0} \times \sum_{i=1}^{m} \bar{d}_i 2^{-i}$$

$$d_i = 1 \text{ if } Q_i^+ > Q_i^-$$

CHARGE IN SCALING CHANNEL AT STAGE m $$Q_{Rm} = Q_{R0} \times 2^{-m} = Q_{R0} \times \sum_{i=m+1}^{\infty} 2^{-i} \quad (3)$$

$$Q_{Rm} \geq Q_m^+ - Q_m^- \text{ for all } m$$

$$\lim_{m \to \infty} Q_m^+ = Q_m^- = 0$$

OFFSET-BINARY CODED RESULT $$Q_0^+ - Q_0^- = Q_{R0} \times \left[ \sum_{i=1}^{N} d_i 2^{-i} - \sum_{i=1}^{N} \bar{d}_i 2^{-i} \right] \quad (4)$$

$$Q_0^+ - Q_0^- = Q_{R0} \times \left[ \sum_{i=1}^{N} d_i 2^{1-i} - 1 + 2^{-N} \right]$$

$$0 \leq Q_0^+ \leq Q_{R0}$$
$$0 \leq Q_0^- \leq Q_{R0}$$

The conversion algorithm utilized in stage 82-M of the converter is tailored to take advantage of those operations easily and accurately performed by CCDs. The signal flow is differential, rather than single-ended, and subtraction from the signal is implemented as addition to its complement. Processing in analog signal paths consists only of sampling, shifting, addition, and division by two, all of which are accomplished using CCDs. A single comparator, which may be implemented in a variety of ways, is needed at each stage to generate the digital result. The digital result is encoded in offset-binary format with a dynamic range spanning $\pm Q_{RO}$, a scaling signal.

Each of the stages 82-1 through 82-N, exemplified by stage 82-M of FIG. 6B, consist of three CCD channels 90, 92, 94, referred to as the positive, negative and scaling channels, with corresponding charge packets denoted $Q_m^+$, $Q_m^-$, and $Q_{Rm}$. Operation begins with the differential signals $Q_O^+$ and $Q_O^-$, whose difference represents the quantity to be digitized, shifted into the first stage 82-1. At the same time, the quantity $Q_{RO}$, to which the digital result will be normalized, enters the scaling channel 94. After shifting through CCD delay units 96, 97, the difference between $Q_O^+$ and $Q_O^-$ is nondestructively sensed, and thereafter passed to a comparator 100 which quantizes the result to a single bit. The signal $Q_{RO}$ is passed through CCD delay unit 98, and thereafter passed to a divide-by-two circuit 102 where the signal is divided into two equal packets. Each of these may either be used as a single bit D/A or passed on to the following stage, depending on the result of comparator 100. The D/A quantity is added to the smaller of $Q_O^+$ and $Q_O^-$ by way of switching elements 104 and 105 which are responsive to the results of the comparator 100. The resulting differential signal is passed on to become the input for the next stage. In this way, $Q_m^+$ and $Q_m^-$ are either increased or preserved at each stage, while the upper bound on their difference, represented by $Q_{Rm}$, decreases exponentially. The resulting digital word is composed of bits corresponding to the comparator's result at each stage. These bits may either be used in a bit-serial manner or be appropriately delayed by delay units 83-1 through 83-N to arrive simultaneously and produce a full digital word.

Similar CCD pipeline analog-to-digital converters are described in U.S. Pat. Nos. 4,375,059 and 4,489,309, incorporated herein by reference.

The output of the ADC 20 is a digital voltage domain signal where the digits and digital word are binary weighted digits. It will be appreciated that the possibility of non-binary conversion is not precluded. The output signal represents the input waveform at the sampling instances. The sampling instances are determined by the clock signal provided by the VCO 26. Therefore, on every rising clock edge a sample of the waveform results. The samples are provided to the digital signal processor 22, which has several functions. Initially, the DSP 22 has to convert the samples now into a recovered digital bit stream. The signal recovery is performed by either a decision feedback equalizer or a Viterbi detector.

An additional function of the DSP following the ADC is to regenerate a clock signal that is synchronous with the input signal, so there is provided a phase-locked loop that encompasses the DAC 24 and the VCO 26. Accordingly, the sampled values go into the Viterbi detector which maps a number of discrete samples into a binary representation. For example, in PR4 the output signals can have values +1, 0, and −1. The detector converts plus one and minus one into a binary one and zero remains at zero. There is mapping of these allowed distinct input levels into a digital binary signal. This is essentially a timing recovery loop, which is a phase-locked loop that regenerates the clock that is synchronous with the bit stream and that is used to sample the input signal, thus driving the sampling process.

In addition, there is included a gain recovery loop that essentially regulates the gain in the channel at the VGA 14. One of the purposes of gain recovery, for example, in the case where an analog to digital converter and/or a charge domain feed forward equalizer are used, a certain input signal range constraint is required. The gain recovery loop monitors the sampled values and compares them to a predetermined reference. Using that information, the loop serves to adjust the gain of the variable gain amplifier, which receives the low amplitude input signal.

Figure 7:
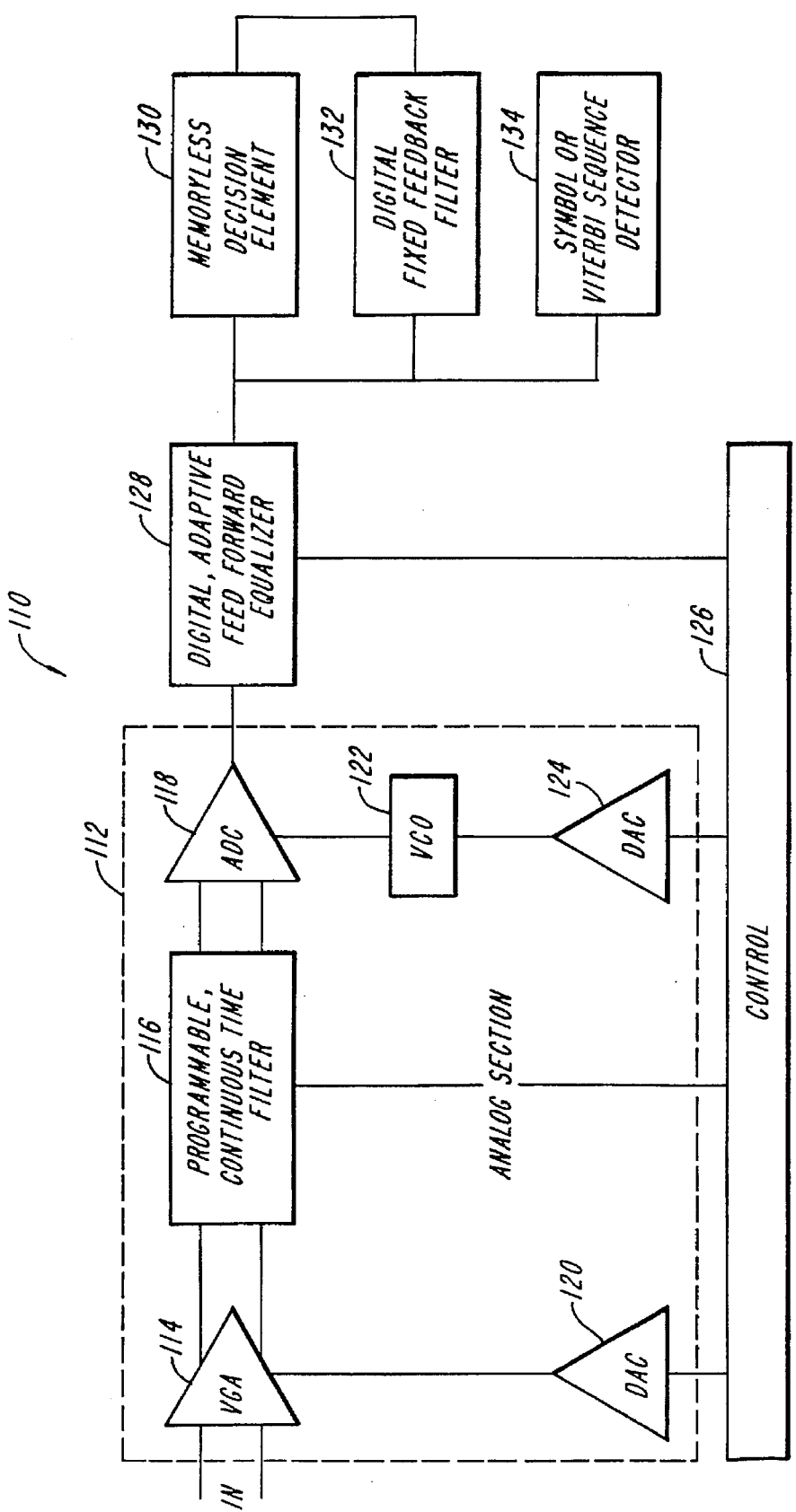
FIG. 7 shows a block diagram of an alternative exemplary embodiment of a data receiving channel in accordance with the present invention illustrated as a PRML disk drive read channel.

With reference now to FIG. 7, a block diagram of an alternative exemplary embodiment of a data receiving channel 110 in accordance with the present invention, illustrated as a PRML disk drive read channel. The channel 110 has an analog front end processing portion 112 which includes a variable gain amplifier 114, a programmable continuous time filter 116 and an analog-to-digital converter 118. An analog read signal is obtained from the disk head and is applied to the analog front end processing portion. The read signal is initially applied to the VGA 114 in order to normalize the signal. The read signal is then applied to a programmable continuous time filter 116 in order to filter the read signal so as to remove high-frequency noise components and to band limit the signal. A control unit 126 is provided to provide control signals for gain and timing control loops via DAC 120, and VCO 122 and DAC 124, respectively. Thereafter the filtered read signal is digitally converted by ADC 118 for further signal processing.

In accordance with the present invention, the digital processing elements of the channel are implemented utilizing CCDs. The digital processing elements include a digital adaptive feed forward equalizer 128, a memoryless decision element 130, a digital fixed feedback filter 132, and a Viterbi sequence detector 134. The decision element 130 and feedback filter 132 serve to derive an error signal for the adaptation operation of the feed forward equalizer 128. The Viterbi detector 134 recursively performs maximum likelihood symbol detection while minimizing the difference between measured channel output values at the equalizer and possible symbol values.

Figure 8:
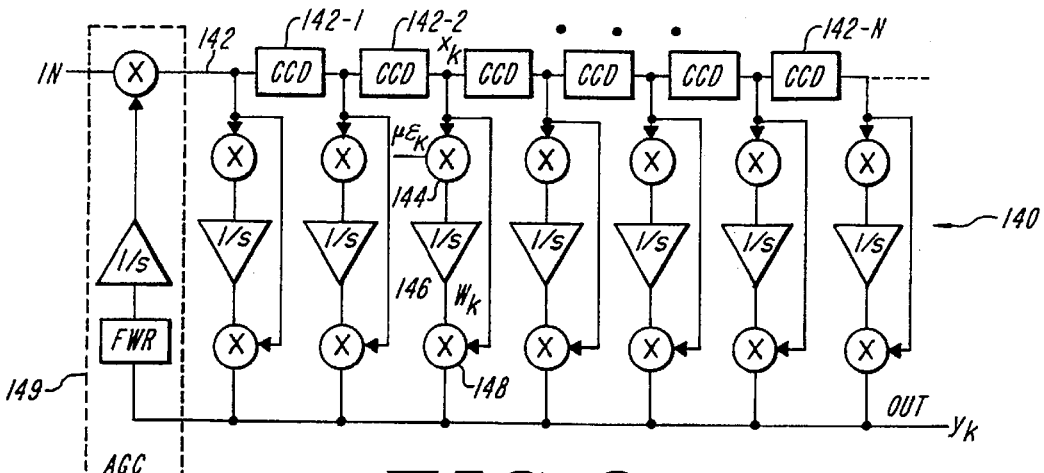
FIG. 8 shows a block diagram of an exemplary adaptive feed forward equalizer implemented as a CCD adaptive FIR filter.

FIG. 8 shows a block diagram of an exemplary adaptive feed forward equalizer 140 implemented as a CCD adaptive FIR filter. The equalizer includes a CCD tapped delay line 142 having delay units 142-1 through 142-N for propagating a charge packet representative of the filtered read signal. The delay line is tapped at predetermined portions. Each tap provides the signal to a multiplier 144 having a weight which is provided via feedback from an integrator 146 and a multiplier 148. The multiplier 144 operates to take the error signal $\epsilon$, multiply it by a constant $\mu$, and integrate that error. Thus, the weight is adaptively adjusted so as to minimize the error.

The equalizer 140 uses the full Least Means Square algorithm:

$$W_{k+1} = W_k + \mu \epsilon_k x_k \quad (5)$$

where $x_k$ is the tap value (charge) at time k, $W_k$ is the tap weight at time k, $\epsilon_k$ is the error at time k, and $\mu$ is the adaptation gain factor.

It will be appreciated that the coefficients can be normalized by using an AGC loop 149. The output of the integrator of the AGC loop can either control the charge amplitude by regulating the sampling pulse width or can feed directly into the tap weight multipliers.

The proposed CCD implementation of the equalizer accommodates an increase in the number of filter taps by an order of magnitude compared to conventional digital filters configured with digital multipliers. An FIR filter with 40–50 taps is sufficient to provide the necessary channel shaping without the continuous time filter in the analog front end, thus further reducing power and removing another bottleneck in the channel. At the same time, the high number of individually programmable taps provides more control over the filter transfer function than continuous time filters could provide.

Figure 9:
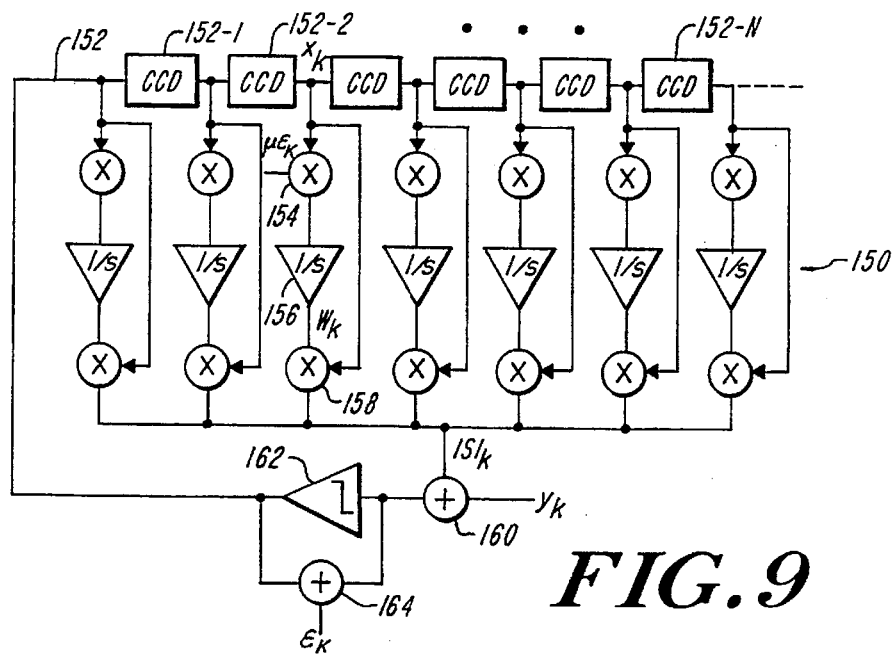
FIG. 9 shows a block diagram of an exemplary decision feedback equalizer having a feed back filter with a memoryless decision element.

FIG. 9 shows a block diagram of an exemplary decision feedback equalizer 150 having a feed back filter with a memoryless decision element. The equalizer 150 includes a CCD tapped delay line 152 with delay units 152-1 through 152-N. Each tap provides a signal to a multiplier 154, an integrator 156, and a multiplier 158 as previously described with reference to the feed forward equalizer 140. A summed output $ISI_k$ of the taps is provided to a summing device 160 which sums it with the output $y_k$ of the feed forward equalizer 140. The result is provided to a comparator 162, and then the output of the comparator is fed back to the tapped delay line 152. The difference between the input signal to the comparator and the output of the comparator, which represents the predetermined nominal value, is developed by summing device 164 as the error signal $\epsilon$. The error signal is fed back to the multipliers of each equalizer for regulating the gain of the adaptation loop. Accordingly, each multiplier receives the scaled error for multiplication with the signal $x_k$ at each tap.

The equalizer 150 operates in accordance with the following equation:

$$ISI_k = \Sigma W_n y_{k-n} \quad (6)$$

where $y_k$ is the received signal and $ISI_k$ is the post cursor (past pulse peak) inter symbol interference.

Decision feedback equalizers are necessary components of read channels, and conventional systems for partial response signalling either use digital implementations or hybrid approaches with A/D converters, multiple shift registers and accumulators and D/A converters to provide signals for adjusting tap weights. Since CCDs easily propagate signals with several discrete values, essentially multiple-valued logic levels, the CCDs eliminate the converters and the digital shift registers. Multiplication and accumulation of error signals can be achieved in the analog domain as well, resulting in more consistent and economical solutions.

Figure 10:
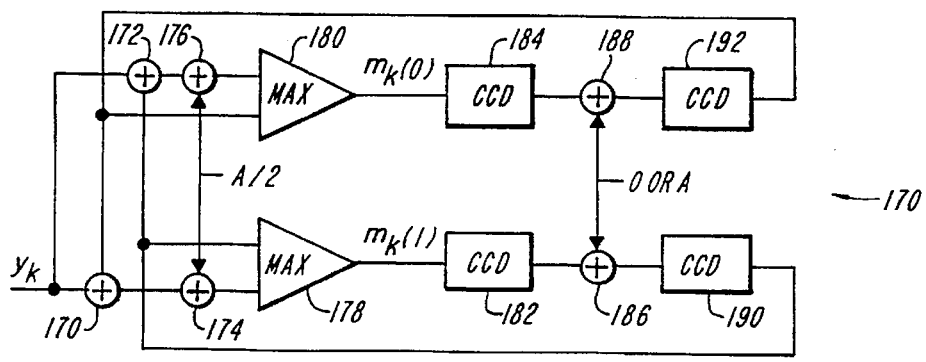
FIG. 10 shows an exemplary block diagram of a CCD implementation of a Viterbi detector in accordance with the present invention.

With reference now to FIG. 10, an exemplary block diagram of a CCD implementation of a Viterbi detector 170 in accordance with the present invention is shown. For purposes of illustration, the Viterbi detector 170 is configured for one half of a PR4 channel. It will be appreciated that the 1-$D^2$ type channel can be segmented into two 1-D channels. Accordingly, the Viterbi detector 170 forms a 1-D channel.

The Viterbi detector 170 includes summing devices 170–176 for receiving the input signal $y_k$ and summing it to feedback from downline processing and to a fixed value of one half the signal peak amplitude. Comparators 178 and 180 determine the maximum of the signals, and pass the determined maximum signals to CCD delay units 182, 184. The signals are then provided to summing devices 186 and 188 which add predetermined values of zero or the signal peak amplitude. The outputs of these summing devices are then passed to CCD delay units 190 and 192, and thereafter fed back to the inputs of the comparators.

The Viterbi detector 170 performs the following node metrics calculation:

$$m_k(0) = max(m_{k-1}(0), m_{k-1}(1) - y_k - A/2) \quad (7)$$

$$m_k(1) = max(m_{k-1}(1), m_{k-1}(0) + y_k - A/2) \quad (7)$$

where A is the signal reference amplitude, $y_k$ is the sampled signal amplitude at time k, $m_k(0)$ is the probability of being in state 0 at time k, and $m_k(1)$ is the probability of being in state 1 at time k. At time k, the detector 170 calculates the path metrics, which are the probabilities of each possible state transition (0-0, 0-1, 1-0, 1-1). These values are added to the previous node metrics values and the comparators select the maximum for each new node metric.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A sampled data read channel for use in a data processing device, comprising:

analog signal processing circuitry operable for receiving data in the form of an input analog signal, and preconditioning said input signal in accordance with selected parameters so as to generate a preconditioned analog input signal;

a first charge transfer device (CTD) signal equalizer which initially transforms said preconditioned analog input signal into a corresponding charge domain analog signal, said first CTD performing waveform shaping of said charge domain analog signal in accordance with a predetermined signal response template;

a second CTD analog-to-digital converter operable for converting said charge domain analog signal into a corresponding digital signal; and a digital signal processor operable for recovering a digital bit stream from said digital signal which is indicative of said data.

2. The sampled data read channel of claim 1, wherein said first CTD signal equalizer comprises an adaptive feed forward equalizer.

3. The sampled data read channel of claim 2, wherein said first CTD signal equalizer comprises a charge-coupled device FIR filter arrangement.

4. The sampled data read channel of claim 3, wherein said charge-coupled device FIR filter arrangement comprises:

at least one input node at which said modified analog input signal is sampled and transformed into charge packets, each charge packet having a charge magnitude proportional to said modified analog input signal and to a filter coefficient;

at least one CCD delay line;

means for propagating said charge packets along said at least one CCD delay line; and an output node at which said filter arrangement produces said waveform shaped charge domain analog signal in the form of a sequence of charge packets.

5. The sampled data read channel of claim 4, wherein said charge-coupled device FIR filter arrangement comprises a pipe organ architecture.

6. The sampled data read channel of claim 2, wherein said first CTD signal equalizer comprises a linear programmable analog-digital transversal filter.

7. The sampled data read channel of claim 1, wherein said second CTD analog-to-digital converter comprises a pipelined charge-coupled analog-to-digital converter architecture.

8. The sampled data read channel of claim 7, wherein said second CTD analog-to-digital converter comprises a plurality of pipelined stages for performing successive approximations on a reference charge and said analog charge domain signal, wherein said pipelined stages include charge processing means each coupled only to directly adjacent stages for performing an inequality function to provide a bit string representing a digital representation of said charge domain analog signal.

9. The sampled data read channel of claim 1, wherein said sampled data read channel comprises a disk drive read channel.

10. The sampled data read channel of claim 9, wherein said sampled data read channel comprises a partial response maximum likelihood of detection (PRML) disk drive read channel.

11. A sampled data read channel for use in a data processing device, comprising:

analog signal processing circuitry operable for receiving data in the form of an input analog signal, and preconditioning said input signal in accordance with selected parameters so as to generate a preconditioned analog input signal;

an analog-to-digital converter operable for converting said preconditioned analog input signal into a corresponding digital signal;

a first charge transfer device (CTD) signal equalizer which initially transforms said digital signal into a corresponding charge domain digital signal, said first CTD performing waveform shaping of said charge domain digital signal in accordance with a predetermined signal response template; and a second CTD digital signal processor operable for recovering a digital bit stream from said charge domain digital signal which is indicative of said data.

12. The sampled data read channel of claim 11, wherein said first CTD signal equalizer comprises a CCD adaptive FIR filter.

13. The sampled data read channel of claim 12, wherein said first CTD signal equalizer comprises:
an input node at which said digital signal is sampled and transformed into charge packets, each charge packet having a charge magnitude proportional to said digital signal and to a filter coefficient;
a CCD tapped delay line having a predetermined number of taps;
means for propagating said charge packets along said CCD tapped delay line;
means coupled to each tap for adaptively weighting said charge packets from each tap; and
an output node coupled to said adaptive weighting means which produces said waveform shaped charge domain digital signal in the form of a sequence of charge packets.

14. The sampled data read channel of claim 11, wherein said second CTD digital signal processor comprises a CCD adaptive feedback equalizer.

15. The sampled data read channel of claim 14, wherein said feedback equalizer comprises:
a CCD tapped delay line having a predetermined number of taps;
means for propagating said charge packets along said CCD tapped delay line;
means coupled to each tap for adaptively weighting said charge packets from each tap;
an output node coupled to said adaptive weighting means which produces a sequence of charge packets;
means for comparing the difference between said sequence of charge packets and said charge domain digital signal so as to generate an error signal for use by said first CTD signal equalizer, and for providing a feedback input to said CCD tapped delay line.

16. The sampled data read channel of claim 11, wherein said second CTD digital signal processor comprises a symbol detector.

17. The sampled data read channel of claim 16, wherein said symbol detector comprises a CCD Viterbi detector.

18. The sampled data read channel of claim 17, wherein said CCD Viterbi detector comprises:
an input node for receiving said charge domain digital signal; and
first and second channels coupled to said input node, each channel including a comparator and at least one CCD delay unit, wherein the respective comparators compare feedback from an associated CCD delay unit to a summation of said charge domain digital and feedback from a CCD delay unit associated with the other channel in order to generate binary representations of said charge domain digital signal.

19. The sampled data read channel of claim 11, wherein said sampled data read channel comprises a disk drive read channel.

20. The sampled data channel of claim 19, wherein said sampled data read channel comprises a partial response maximum likelihood of detection (PRML) disk drive read channel.

21. A sampled data read channel for use in a data processing device, comprising:
analog signal processing circuitry operable for receiving data in the form of an input analog signal, and preconditioning said input signal in accordance with selected parameters so as to generate a preconditioned analog input signal;
an analog-to-digital converter operable for converting said preconditioned analog input signal into a corresponding digital signal;
a first charge transfer device (CTD) signal equalizer which initially transforms said digital signal into a corresponding charge domain digital signal, said first CTD performing waveform shaping of said charge domain digital signal in accordance with a predetermined signal response template; and
a second CTD digital signal processor operable for recovering a digital bit stream from said charge domain digital signal which is indicative of said data, said second CTD including a CCD adaptive feedback equalizer.

22. The sampled data read channel of claim 21, wherein said feedback equalizer comprises:
a CCD tapped delay line having a predetermined number of taps;
means for propagating said charge packets along said CCD tapped delay line;
means coupled to each tap for adaptively weighting said charge packets from each tap;
an output node coupled to said adaptive weighting means which produces a sequence of charge packets;
means for comparing the difference between said sequence of charge packets and said charge domain digital signal so as to generate an error signal for use by said first CTD signal equalizer, and for providing a feedback input to said CCD tapped delay line.

23. The sampled data read channel of claim 21, wherein said second CTD digital signal processor comprises a symbol detector.

24. The sampled data read channel of claim 23, wherein said symbol detector comprises a CCD Viterbi detector.

25. The sampled data read channel of claim 24, wherein said CCD Viterbi detector comprises:
an input node for receiving said charge domain digital signal; and
first and second channels coupled to said input node, each channel including a comparator and at least one CCD delay unit, wherein the respective comparators compare feedback from an associated CCD delay unit to a summation of said charge domain digital signal and feedback from a CCD delay unit associated with the other channel in order to generate binary representations of said charge domain digital signal.

26. The sampled data read channel of claim 21, wherein said sampled data read channel comprises a disk drive read channel.

27. The sampled data read channel of claim 26, wherein said sampled data read channel comprises a partial response maximum likelihood of detection (PRML) disk drive read channel.

28. A sampled data read channel for use in a data processing device, comprising:
analog signal processing circuitry operable for receiving data in the form of an input analog signal, and preconditioning said input signal in accordance with selected parameters so as to generate a preconditioned analog input signal;

a first charge transfer device CTD signal equalizer which initially transforms said preconditioned analog input signal into a corresponding charge domain analog signal, said first CTD performing waveform shaping of said charge domain analog signal in accordance with a predetermined signal response template, said first CTD comprising a charge-coupled device adaptive feed forward equalizer.

29. The sampled data read channel of claim 28 further comprising a second CTD analog-to-digital converter operable for converting said analog signal into a corresponding digital signal.

30. The sampled data read channel of claim 29 further comprising a digital signal processor operable for recovering a digital bit stream from said digital signal which is indicative of said data.

31. The sampled data read channel of claim 28, wherein said first CTD signal equalizer comprises a charge-coupled device FIR filter arrangement.

32. The sampled data read channel of claim 31, wherein said charge-coupled device FIR filter arrangement comprises:

at least one input node at which said preconditioned analog input signal is sampled and transformed into charge packets, each charge packet having a charge magnitude proportional to said preconditioned analog input signal and to a filter coefficient;

at least one CCD delay line;

means for propagating said charge packets along said at least one CCD delay line; and an output node at which said filter arrangement produces said waveform shaped charge domain analog signal in the form of a sequence of charge packets.

33. The sampled data red channel of claim 32, wherein said charge-coupled device FIR filter arrangement comprises a pipe organ architecture.

34. The sampled data read channel of claim 28, wherein said first CTD signal equalizer comprises a linear programmable analog-digital transversal filter.

35. The sampled data read channel of claim 29, wherein said second CTD analog-to-digital converter comprises a pipelined charge-coupled analog-to-digital converter architecture.

36. The sampled data read channel of claim 35, wherein said converter comprises a plurality of pipelined stages for performing successive approximations on a reference charge and said charge domain analog signal, and wherein said pipelined stages include charge processing means each coupled only to directly adjacent stages for performing an inequality function to provide a bit string representing a digital representation of said charge domain analog signal.

37. The sampled data read channel of claim 28, wherein said sampled data read channel comprises a disk drive read channel.

38. The sampled data read channel of claim 37, wherein said sampled data read channel comprises a partial response maximum likelihood of detection (PRML) disk drive read channel.

* * * * *